(12) United States Patent
Ebling et al.

(10) Patent No.: US 8,761,436 B2
(45) Date of Patent: Jun. 24, 2014

(54) DEVICE FOR IDENTIFYING AND/OR CLASSIFYING MOVEMENT PATTERNS IN AN IMAGE SEQUENCE OF A SURVEILLANCE SCENE, METHOD AND COMPUTER PROGRAM

(75) Inventors: Julia Ebling, Hildesheim (DE); Hartmut Loos, Hildesheim (DE); Matthias Koenig, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 584 days.

(21) Appl. No.: 12/666,923

(22) PCT Filed: Jun. 6, 2008

(86) PCT No.: PCT/EP2008/057127
§ 371 (c)(1),
(2), (4) Date: Dec. 28, 2009

(87) PCT Pub. No.: WO2009/003793
PCT Pub. Date: Jan. 8, 2009

(65) Prior Publication Data
US 2010/0177936 A1 Jul. 15, 2010

(30) Foreign Application Priority Data
Jul. 5, 2007 (DE) .......................... 10 2007 031 302

(51) Int. Cl.
*G06K 9/00* (2006.01)
*H04N 7/18* (2006.01)
(52) U.S. Cl.
USPC ............................ 382/103; 348/143; 348/152
(58) Field of Classification Search
USPC ........ 382/103, 104, 107; 375/240.01, 240.16, 375/240.17; 348/142, 143, 149, 152–155, 348/208.14
See application file for complete search history.

(56) References Cited

U.S. PATENT DOCUMENTS 6,628,715 B1 * 9/2003 Iu et al. ..................... 375/240.16
7,123,745 B1 * 10/2006 Lee ............................... 382/103
(Continued)

FOREIGN PATENT DOCUMENTS

DE    10 2006 053 286    5/2008

OTHER PUBLICATIONS

Julia Ebling et al. "Clifford Convolution and Pattern Matching on Vector Fields" VIS'03 Proceedings of the 14th IEEE Visualization 2003 (VIS's 03) pp. 193-200.*

(Continued)

*Primary Examiner* — Brian Le
(74) *Attorney, Agent, or Firm* — Michael J. Striker

(57) ABSTRACT

The invention relates to video surveillance systems that are used, for example, for surveying public places, stations, streets, industrial estates, buildings or similar. Said video surveillance systems comprise one or more surveillance cameras that are oriented towards surveillance scenes and transfer image data streams, in the form of image sequences, to an evaluation center. The invention also relates to a device (1) for identifying and/or classifying a movement pattern in an image sequence of a surveillance scene comprising a plurality of moving objects, an interface (2) for recording the image sequence, a calculation module (5) for determining an optical flow field (10) in the surveillance scene by evaluating the image sequence and an identification module (6) that is designed in terms of programming and/or circuitry such that the optical field and/or partial areas thereof are compared to one or more patterns in order to identify the movement pattern in the image sequence.

15 Claims, 3 Drawing Sheets

(56) References Cited

U.S. PATENT DOCUMENTS

| | | | |
|---|---|---|---|
| 7,646,887 B2* | 1/2010 | Goncalves et al. | 382/103 |
| 2003/0210807 A1* | 11/2003 | Sato et al. | 382/104 |
| 2006/0140447 A1* | 6/2006 | Park et al. | 382/104 |
| 2008/0112595 A1 | 5/2008 | Loos | |

OTHER PUBLICATIONS

Axel Baumann et al: "A Review and Comparison . . . " EURASIP International Journal of Image and Video Processing, Hindawi Publishing Corporation, BD. 2008, Jan. 1, 2008, pp. 1-30 (in Eng.).

Andrade, E., et al: "Detection of Emergency Events . . . " The Institution of Engineering and Technology Conference on Crime and Security, Jun. 13-14, 2006, London, UK, pp. 528-533 (in Eng.).

Gryn, J. M. et al: "Detecting Motion Patterns Vis Direction Maps . . . " 2005 Seventh IEEE Workshops on Applications on Computer Vision, Jan. 5-7, 2005, pp. 202-209 (in Eng.).

Julia Ebling et al: "Clifford Convolution and Pattern . . . " Scientific Visualization: The Visual Extraction of Knowledge From Data, Springer Berlin Heidelberger, Jan. 1 2006, pp. 231-248 (in Eng.).

Julia Ebling et al: "Topology Based Flow Analysis and . . . " Topology-Based Methods in Visualization, Springer-Verlag Berlin Heidelberger, Jan. 1, 2007, pp. 91-104 (in Eng.).

Haussecker, H., Et Asl:"Chapter 10: Motion" Computer Vision and Applications, Academic Press, San Diego, CA, US, Jan. 1, 2000, pp. 347-395 (in Eng.).

Davies E. Roy:"Chapter 18-Motion", Jan. 1, 2005, Machine Vision: Theory, Algorithms, Practicalities, Elseview, Amsterdam, pp. 505-544 (in Eng.).

Julia Ebling: "Visialization and Analysis of Flow Fields . . . " Dissertation University Leipzig, Jul. 17, 2006, pp. 1-178 (in Eng.).

\* cited by examiner

DEVICE FOR IDENTIFYING AND/OR CLASSIFYING MOVEMENT PATTERNS IN AN IMAGE SEQUENCE OF A SURVEILLANCE SCENE, METHOD AND COMPUTER PROGRAM

BACKGROUND INFORMATION

The present invention relates to a device for identifying and/or classifying movement patterns in an image sequence of a surveillance scene, the device including an interface for recording the image sequence, and a calculation module for determining an optical flow field in the surveillance scene by evaluating the image sequence. The present invention also relates to a related method and a computer program.

Video surveillance systems are used, for example, to monitor public places, train stations, streets, industrial complex, buildings, or the like. Video surveillance systems usually include one or more surveillance cameras that are directed toward surveillance scenes and transfer image data streams in the form of image sequences to an evaluation center. Although it used to be common for the image sequences to be evaluated by trained surveillance personnel, it has since become increasingly common for evaluations to be performed automatically using digital image processing. The main advantages of automated evaluations of this type are that personnel costs are markedly reduced, and that the surveillance quality remains consistent.

Movement patterns in surveillance scenes are often identified and/or classified by separating moving objects from the (substantially stationary) background in the scene, to track them over time, and to trigger an alarm if relevant movements are identified. In a first step of "object segmentation", the method used typically evaluates the differences between the current camera image and a "scene reference image" that models the static scene background, in order to identify moving objects.

In a different approach, the optical flow in the surveillance scene is monitored by evaluating the image sequence. In the calculation of the optical flow, the translatory motions of pixels or image regions from one image to a subsequent image in the image sequence are evaluated and, based on these translatory motions, a vector field is created that depicts a direction and speed of translation for every pixel or region being investigated. In this approach, object segmentation is carried out by classifying objects that agree in terms of polar vectors, that is, in terms of optical flow, as belonging to one common object.

DISCLOSURE OF THE INVENTION

According to the present invention, a device is provided for identifying and/or classifying movement patterns in an image sequence of a surveillance scene having the features of claim 1, a related method having the features of claim 12, and a computer program having the features of claim 14. Preferred or advantageous embodiments of the present invention result from the dependent claims, the description that follows, and/or the attached figures.

The device according to the present invention differs from the known related art in particular in that the movement patterns are not necessarily identified and then classified via the intermediate route of object segmentation and subsequent object tracking, but rather in that the optical flow field itself is investigated for characteristic movement patterns by comparing it with specified and/or specifiable patterns, in particular flow masks. Therefore, while the related art describes an approach using single objects, the present invention describes an approach based on a plurality of objects, and which simultaneously analyzes all moving objects in the surveillance scene and/or a subregion of the surveillance scene.

The device is preferably designed as a video surveillance system, which is realized, e.g., as a data processing device, computer, DSP, microcontroller, FPGA, ASIC, or the like, and/or that includes one or more interfaces for recording image sequences of one or more surveillance scenes. The interfaces are connected and/or are connectable to a plurality of cameras, recorders, and/or other storage media on which the image sequences are made available or may be made available. The device according to the present invention is suited, in particular, for real-time use, since it requires a relatively small amount of computing power, although it may also analyze previously stored image sequences, off-line in particular.

As explained in the introduction, for example, the surveillance scene may be a street scene, an intersection, a public building, a train station, etc. The surveillance scene preferably shows a plurality of moving objects, which may be, in particular, persons, e.g., passengers, or vehicles or the like. The image sequence comprises a plurality of images of the surveillance scene that were recorded at equidistant time intervals in particular, it being possible for the images to have any specification, e.g., they may be realized as color, grayscale, black and white, infrared, and/or UV images.

The device according to the present invention includes a calculation module which is programmed and/or electronically configured to determine an optical flow field in the surveillance scene by evaluating the image sequence. The optical flow field—also referred to as "optical flow"—may be depicted as a vector field that shows the preferably two-dimensional direction and/or velocity of motion for every image point or every selected image point, for every pixel or every selected pixel, and/or for every or every selected region of the images in an image sequence. The optical flow field may be calculated using differential methods, or by using any other known methods.

According to the present invention, it is provided that the device includes an identification module that is programmed and/or electronically configured such that the optical field and/or subregions thereof are compared to one or more patterns in order to identify the movement pattern in the image sequence.

In particular, the movement pattern is identified without the intermediate steps of object segmentation and tracking, thereby making it possible to prevent inaccuracies in the analysis and to reduce computing time. The proposed invention therefore uses the information obtained by calculating the motion of small image regions, it even being possible for an image region to be composed of a single pixel. Nor is it necessary to have a scene reference image in order to calculate these optical flow fields, since only the current camera images are used. Preferably, the development of flow fields over time is also observed.

A further useful advantage of the present invention is that the fundamental method may even be used when so many moving objects appear in the surveillance scene that they overlap one another or blend together, and/or when object segmentation, e.g., via a scene reference image, is no longer possible, or is no longer possible with the necessary level of reliability. The present invention therefore makes it possible to identify movement patterns in the image sequences even in overpopulated surveillance scenes. In particular, the present invention is suited to identifying movement patterns that are based on mass psychology and/or group dynamics, i.e., in particular on the shared behavior of large gatherings of people. Examples of movement patterns of this type are flowing together, flowing apart, flowing around a central point, etc.

In a preferred embodiment of the present invention, the movement pattern is depicted as a global movement pattern which describes the movement in the entire surveillance scene. This embodiment is particularly well suited for use when the surveillance scene shows a crowd of people, and the aim is to classify a shared behavior of the people in the crowd by analyzing the movement pattern.

In an alternative embodiment of the present invention, the movement pattern is depicted as a local movement pattern which describes the movement in a subregion of the surveillance scene. In one possible alternative of the embodiment, the subregion may be adjusted by a user so that, e.g., an escalator is selected as the subregion, or it is automatically ascertained in another possible alternative of the embodiment, e.g., by selecting subregions in which more object movements are detected than are detected in other subregions of the surveillance scene. However, it is preferable for the subregion of surveillance scenes to include a large number of moving objects, in order to best utilize the advantages of the present invention.

In a further development of the present invention, the device includes a classification module that assigns a surveillance situation to the surveillance scenes with consideration for the movement pattern(s) that was/were identified. In particular, the device according to the present invention has an application-specific character in that the surveillance scene is assigned, as a real surveillance scene, to a real surveillance situation. In general, real surveillance situations of this type may have any type of design, e.g., they may be persons standing in a line, a regularly traveled street, a properly navigated roundabout, etc. The present invention is therefore suited for use to automatically identify real surveillance situations, preferably dangerous situations, e.g., persons who have fallen, fleeing behavior, panic, and situations that attract gawkers, in particular in overpopulated surveillance scenes, and to trigger a response, such as sending out an alarm call. However, it is preferably provided that the classification module include any selection of the following assignments:

A movement pattern having flow lines directed toward a common point, i.e., a convergence, is assigned to the surveillance situation "gather", A surveillance situation of this type occurs, e.g., when moving objects flow together, in particular when people or "gawkers" move toward a central point.

A movement pattern having flow lines directed away from a common point, i.e., a divergence, is assigned to the surveillance situation "scatter". A surveillance situation of this type occurs when moving objects flow away from one another, e.g., when persons flee from a central point.

A movement pattern having flow lines that extend around a common point is assigned to the surveillance situation "avoid", and is an example of a surveillance situation in which the surveillance scene includes an obstacle that is being avoided by the moving objects.

For the case in which the calculation module is unable to determine any agreement or sufficient agreement with the available patterns used for comparison purposes, the calculation module is designed to determine statistical parameters of the optical flow field. This embodiment is particularly useful when it is not possible to identify a structure or movement model in an optical flow field. Statistical parameters are determined in order to check whether the surveillance scene may be assigned to the surveillance situation "chaos" or "panic".

Even when movement patterns are identified, the device is preferably designed such that the identified movement pattern is confirmed or verified using statistical parameters or other types of parameters.

In a preferred realization of the device, the pattern is depicted as a two-dimensional or three-dimensional data field. It may be provided that the size of the pattern corresponds to the size of an image in the image sequence. As an alternative, it may be provided that the size of the pattern is limited to the size of a subregion, in particular the subregion of the image to be investigated, and therefore to the relevant surveillance scene. In one possible alternative, the pattern is depicted as a window that is moved across the optical flow field, e.g., in a gliding manner.

In a preferred embodiment of the present invention, the movement pattern is identified via the use of a classification method. In a classification method of this type, the optical flow field is compared to a first pattern in a first classification step, to a second pattern in a second classification step, and to an nth pattern in an nth classification step. A movement pattern is therefore identified via a plurality of positively classified, individual patterns. To reduce computing time, it may be provided, e.g., that, as soon as a pattern of a classification step cannot be found in the optical flow field, this pattern is discarded.

In further embodiments, the classification method is designed as a classification tree, in which the branches of the tree represent classification steps.

Since, after a plurality of patterns is applied to the optical flow field, the result is an evaluation of the agreement of the plurality of patterns with the optical flow field, it is preferable for the movement pattern to be identified based on a plurality of patterns that have been found. The assignment of the plurality of patterns to a movement pattern may be implemented, e.g., automatically, by a learning method.

Upon implementation, the pattern(s) is/are depicted as a linear, shift-invariant pattern, and/or the patterns are compared using a Clifford convolution. The particular advantages of a Clifford convolution and the use of vector fields are described, e.g., in the dissertation written by the inventor, Julia Ebling, entitled "Visualization and Analysis of Flowfields based on Clifford-Convolution", University of Leipzig, Diss.

A further subject of the present invention relates to a method for identifying and/or classifying a or the movement pattern in an image sequence of a or the surveillance scene having the features of claim 12; the method is preferably carried out on the above-described device and/or on the device as recited in the preceding claims.

According to the method, in an initial step, the optical flow field in the image sequence of the surveillance scene is calculated and, in a second step, the optical flow field is compared to one or a plurality of patterns in order to identify a or the movement pattern in the image sequence and/or in the surveillance scene. A further, optional step is to assign a surveillance situation to the movement pattern that was identified.

A further subject of the present invention relates to a computer program which includes program code means having the features of claim 15.

BRIEF DESCRIPTION OF THE DRAWINGS

Further features, advantages, and effects of the present invention result from the description that follows of a preferred embodiment, and from the attached figures.

EMBODIMENT(S) OF THE INVENTION

Figure 1:
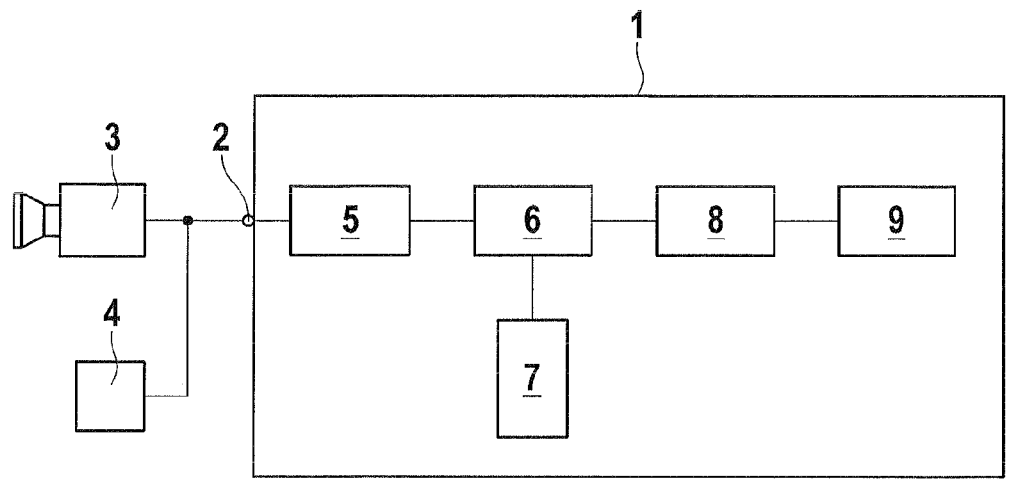
FIG. 1 shows a block diagram of a video surveillance system as a first embodiment of the present invention.

FIG. 1 shows a schematic block diagram of a video surveillance system 1 which may be used to monitor open areas, buildings, intersections, traffic junctions, or the like, and which is designed, e.g., as a computer system.

Video surveillance system 1 is connected via an interface 2 to one or more surveillance cameras 3, and to one or more video recorders 4. Surveillance cameras 3 are positioned to monitor the stated surveillance scenes, and send the image data stream initially for intermediate storage in video recorder(s) 4, or directly to video surveillance system 1.

From interface 2, the image data streams, which correspond to image sequences of the surveillance scene, are first transferred to a calculation module 5. Calculation module 5 is programmed and/or electronically configured to generate, from an image sequence of a surveillance scene, an optical flow field and/or an optical flow field that changes over time. The optical flow field is created, e.g., for the translatory movements of pixels or regions in the images of the image sequence across at least two and preferably more than ten images. It may also be provided that the optical flow field is created for the image sequence in a quasi gliding manner in that, in order to calculate the current optical flow field, the oldest image is removed from the calculation of the optical flow field, and it is replaced with the newest image in the image sequence (FiFo).

The optical flow field that is generated is transmitted to an identification module 6 which is designed to compare the optical flow field to patterns or pattern masks from a pattern memory 7; the patterns in pattern memory 7 are designed such that movement patterns may be identified in the image sequence and/or in the surveillance scene. The patterns in pattern memory 7 may be designed, for this purpose, as two-dimensional or three-dimensional data fields, and they may have a size that is similar to that of an image in the image sequence or that is similar to that of a subregion of an image in the image sequence. A single pattern from pattern memory 7 may be applied to the optical flow field in order to identify a movement pattern in the optical flow field, or, as an alternative, a plurality of patterns from pattern memory 7 is applied to the optical flow field, and the movement pattern is identified based on classification procedures, decision trees, etc.

Once a movement pattern has been identified, it is transmitted to a classification module 8 which is designed to assign a certain real surveillance situation to the movement pattern that was identified, such as fleeing, flowing together, chaos, panic, etc. As soon as the movement pattern has been assigned to the surveillance situation, a message may be transmitted, as an option, to surveillance personnel via a notification module 9.

The procedure that takes place in video surveillance system 1 therefore comprises the steps of receiving images or image sequences of a surveillance scene, calculating the optical flow field for the current image in the image sequence, performing an optional time-based filtering of the optical flow field in order to suppress interferences, and determining surveillance situations by comparing the optical flow field(s) to predefined flow masks or patterns that describe typical movement patterns, analyzing the similarities that were calculated, performing an optional statistical analysis of the directions of motion for further information and to secure the results, and, finally, classifying the surveillance situation, possibly for various image regions.

Figure 2:
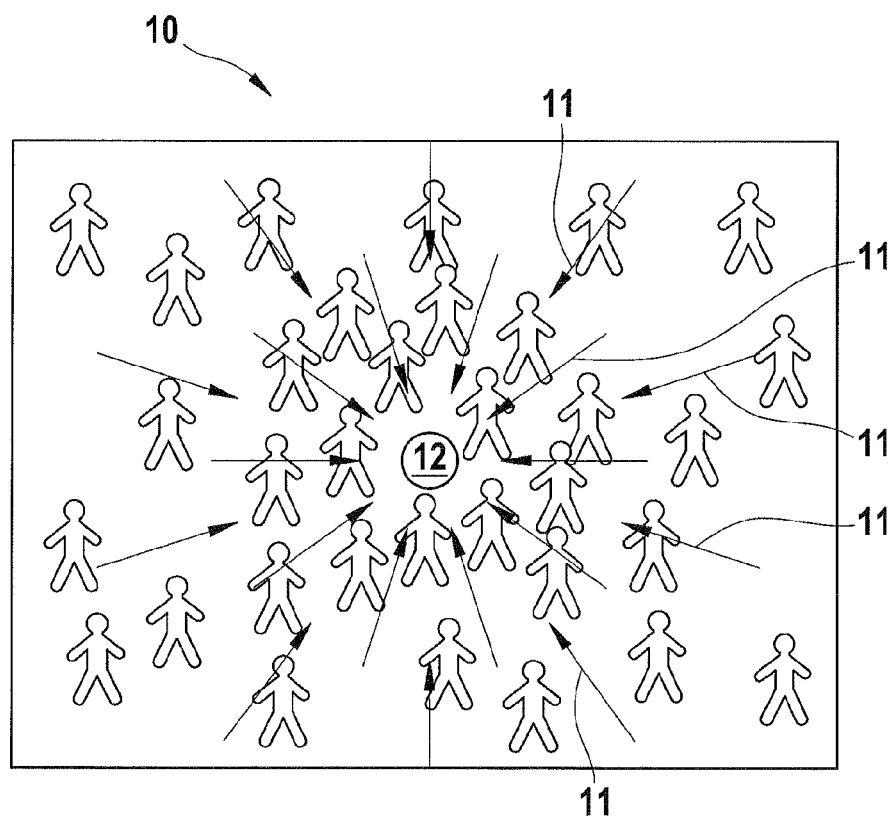
FIG. 2 shows a schematic depiction as a first example of an optical flow field having a first movement pattern.

FIG. 2 shows a highly schematicized depiction of a first example of an optical flow field 10 having a movement pattern of the type that arises when persons flow together, e.g., to gawk at a scene. As indicated in the figure, all or most of the motion vectors 11 point toward a common center 12, thereby making it possible for identification module 6 to easily identify this movement pattern in an automated manner. The movement pattern may be referred to, e.g., as a convergent movement pattern. The movement pattern identified by identification module 6 is then reported to classification module 8 which assigns the surveillance situation "persons flowing toward" to this convergent movement pattern. Since the incident of persons flowing toward a common center 12 is usually triggered by an unforeseen event having taken place at common center 12, e.g., an accident or the like, the classification of the convergent movement pattern results in an alarm being triggered in notification module 9.

Figure 3:
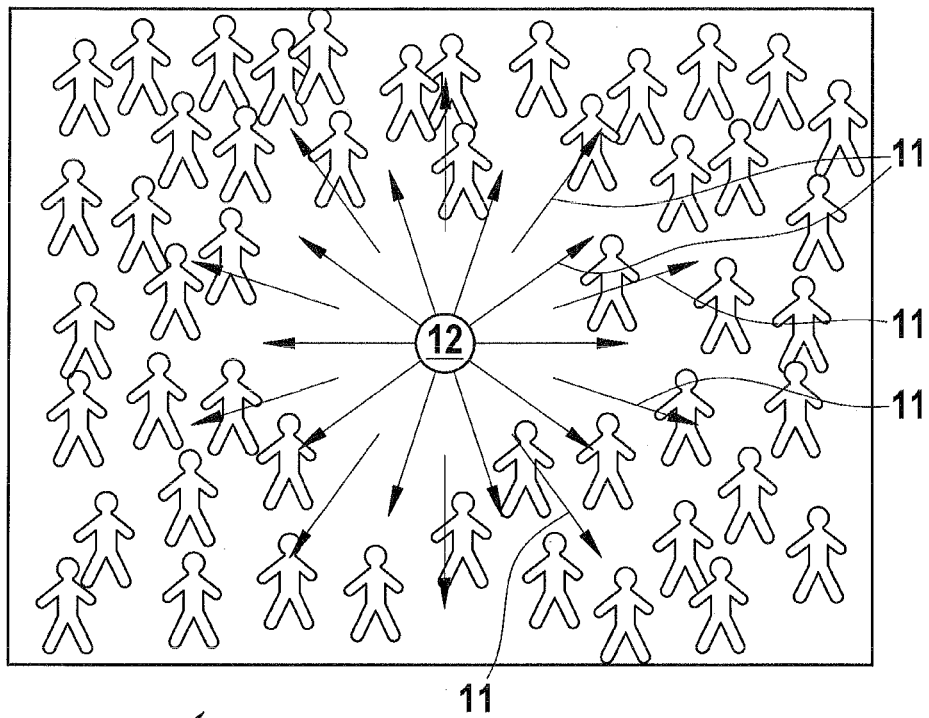
FIG. 3 shows a schematic depiction as a second example of an optical flow field having a second movement pattern.

FIG. 3 shows a second embodiment of a schematicized optical flow field 10 having a movement pattern of the type that arises when persons flow apart, e.g., when fleeing. In this embodiment, all or most flow vectors 11 move away from common center 12 in a star-shaped formation. Identification module 6 will identify this movement pattern, e.g., as a divergent movement pattern, and transmit it to classification module 8. Classification module 8 will assign the surveillance situation "flee" to this divergent movement pattern and instruct notification module 9 to trigger an alarm.

Figure 4:
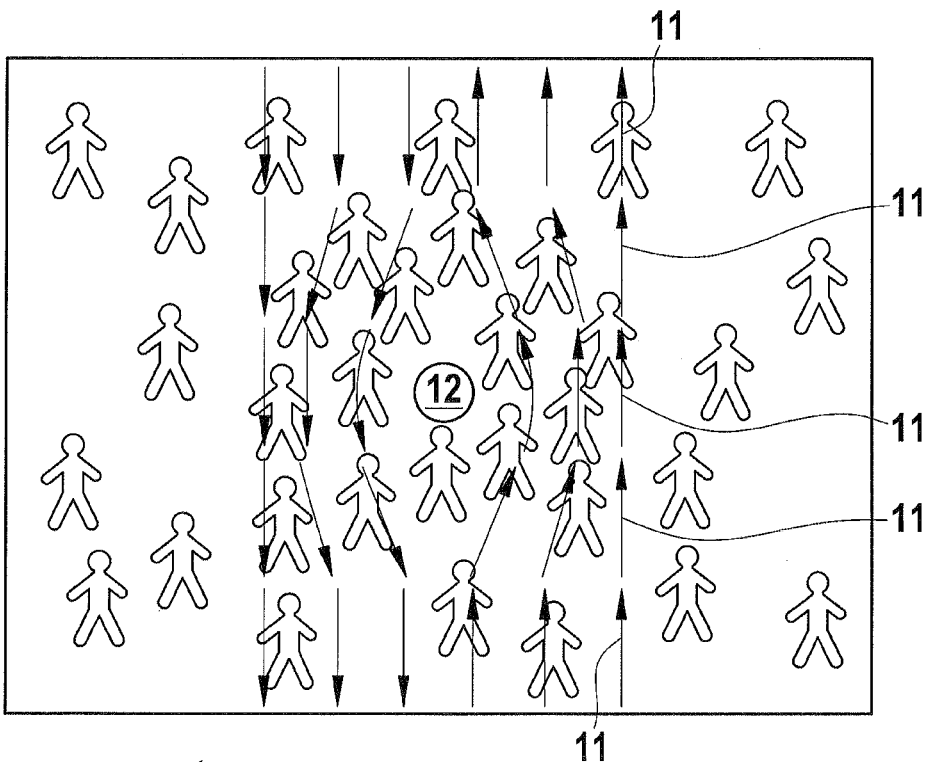
FIG. 4 shows a schematic depiction as a third example of an optical flow field having a third movement pattern.

FIG. 4 shows a third example of an optical flow field 10, in which case the movement pattern shows persons avoiding an obstacle. In this case, two flows result for flow vectors 11; the flow located on the left side of FIG. 4 extends from top to bottom, and the flow located on the right side extends from bottom to top. Common center 12 is being avoided by both flows. When classification module 8 receives this movement pattern, it will assign the surveillance situation of an obstacle appearing to the surveillance scene, and likewise trigger an alarm in notification module 9.

Figure 5:
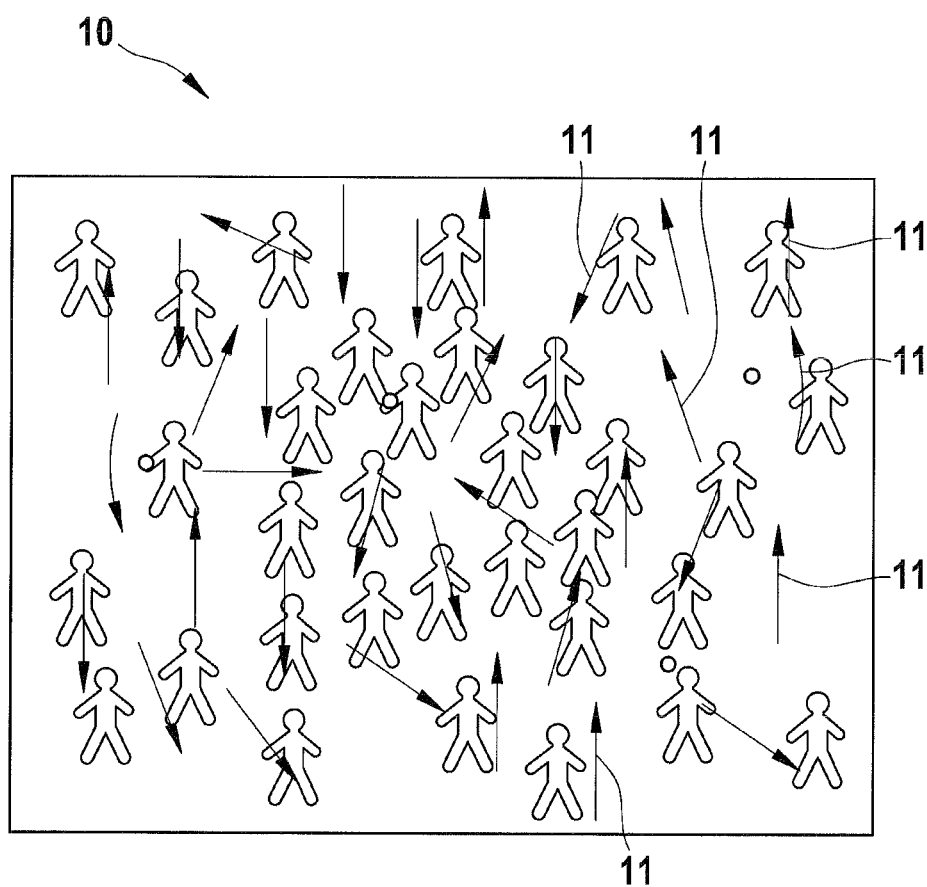
FIG. 5 shows a schematic depiction as a fourth example of an optical flow field having a fourth movement pattern.

FIG. 5 shows a final embodiment of an optical flow field 10, in which case flow vectors 11 do not have a uniform direction, and a common center does not exist. When a movement pattern of this type, which may be referred to as a chaotic movement pattern, is transmitted, or when the message is transmitted that a movement pattern could not be found, classification module 8 will assume that the surveillance situation is a panic situation and likewise activate notification module 9.

In all of the movement patterns shown in FIGS. 2 through 5, it is possible to improve the quality of the results and the classification of the surveillance situation by performing additional statistical expansions of flow vectors 11 and checking to determine whether the surveillance situation to be classified may be combined logically, e.g., to the velocities of the flow vectors. The statistical reinforcement therefore represents an additional check of the results.

In all, the present invention presents a video-based surveillance system that may be used to observe entire scenarios, and is particularly suited for use to observe dangerous situations in overpopulated scenes, i.e., in scenes in which a very large number of moving objects move.

What is claimed is:

1. A device (1) for identifying and classifying movement patterns of gatherings of people in an image sequence of a surveillance scene, comprising
a plurality of moving objects,
an interface (2) for recording the image sequence,
a calculation module (5) for determining an optical flow field (10) in the surveillance scene by evaluating the image sequence,
an identification module (6) programmed to compare one of the group of the optical field, subregions thereof and both to one or more patterns in order to identify a movement pattern of gatherings of people in the image sequence and outputting the movement pattern of the gatherings of people; and
a classification module (7) including selection of the following assignments:
a movement pattern having flow lines (11) directed toward a common point (12) is assigned to the surveillance situation "gather of people"; and
a movement pattern having flow lines (11) that extend around a common point (12) is assigned to the surveillance situation "avoid".

2. The device (1) as recited in claim 1, wherein the movement pattern is depicted as a global movement pattern that describes the movements in the entire surveillance scene.

3. The device (1) as recited in claim 1, wherein the movement pattern is depicted as a local movement pattern that describes the movement in a subregion of the surveillance scene and wherein the subregion contains and/or may contain a plurality of moving objects.

4. The device (1) as recited in claim 1, wherein the classification module (7) is designed to assign the surveillance scene to a real surveillance situation, based on the movement pattern that was identified.

5. The device (1) as recited in claim 4, wherein the classification module (7) includes assignment of a movement pattern having flow lines (11) directed away from a common point (11) is assigned to the surveillance situation "scatter of people".

6. The device (1) as recited in claim 1, wherein the calculation module (5) is designed to determine statistical parameters of the flow field if there is insufficient or no agreement in the pattern comparison.

7. The device (1) as recited in claim 1, wherein the pattern is depicted as a two-dimensional or three-dimensional data field.

8. The device (1) as recited in claim 1, wherein the identification module (6) is designed to identify the movement pattern by using a classification method.

9. The device (1) as recited in claim 1, wherein the identification module (6) is designed to identify the movement pattern based on a plurality of patterns that were found.

10. The device (1) as recited in claim 1, wherein the pattern(s) is/are depicted as linear shift-invariant patterns.

11. The device (1) as recited in claim 1, wherein the identification module (6) is designed to convert the movement pattern using a Clifford convolution.

12. A method (1) for identifying and classifying a movement pattern, using the device as recited in claim 1, comprising the steps:
calculating a or the optical flow field (10) in a or the image sequence of a or the surveillance scene comprising moving objects; and
comparing the optical flow field (10) to one or more patterns in order to identify the movement pattern in the image sequence.

13. The method as recited in claim 12, further comprising the step:
assigning the identified movement pattern to a real surveillance situation.

14. A computer program comprising program code means embedded in a non-transitory computer-readable medium for carrying out all steps of the method as recited in claim 12 when the program is run on a computer and/or a device.

15. A device (1) for identifying and/or classifying movement patterns of gatherings of people in an image sequence of a surveillance scene, comprising
a plurality of moving objects,
an interface (2) for recording the image sequence,
a calculation module (5) for determining an optical flow field (10) in the surveillance scene by evaluating the image sequence, and
an identification module (6) electronically configured to compare one of the group of the optical field, subregions thereof and both to one or more patterns in order to identify a movement pattern of gatherings of people in the image sequence and outputting the movement pattern of the gatherings of people; and
a classification module (7) including selection of the following assignments:
a movement pattern having flow lines (11) directed toward a common point (12) is assigned to the surveillance situation "gather of people"; and
a movement pattern having flow lines (11) that extend around a common point (12) is assigned to the surveillance situation "avoid".

* * * * *